US008306942B2

(12) United States Patent
Chen et al.

(10) Patent No.: US 8,306,942 B2
(45) Date of Patent: Nov. 6, 2012

(54) DISCRIMINANT FOREST CLASSIFICATION METHOD AND SYSTEM

(75) Inventors: Barry Y. Chen, San Ramon, CA (US);
William G. Hanley, Livermore, CA (US); Tracy D. Lemmond, Tracy, CA (US); Lawrence J. Hiller, Livermore, CA (US); David A. Knapp, Livermore, CA (US); Marshall J. Mugge, Westerly, RI (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 673 days.

(21) Appl. No.: 12/436,667

(22) Filed: May 6, 2009

(65) Prior Publication Data

US 2009/0281981 A1 Nov. 12, 2009

Related U.S. Application Data (60) Provisional application No. 61/050,796, filed on May 6, 2008.

(51) Int. Cl.
*G06F 15/00* (2006.01)
*G06F 15/18* (2006.01)

(52) U.S. Cl. ............... 706/62; 706/12; 706/45; 706/47; 706/52

(58) Field of Classification Search .................. None
See application file for complete search history.

(56) References Cited

U.S. PATENT DOCUMENTS

| 5,930,392 | A  | * | 7/1999  | Ho ................... 382/224       |
| 6,009,199 | A  | * | 12/1999 | Ho ................... 382/224       |
| 6,148,303 | A  | * | 11/2000 | Morimoto et al. .......... 1/1       |
| 7,644,049 | B2 | * | 1/2010  | Bradski ................. 706/12     |
| 7,747,547 | B1 | * | 6/2010  | Buturovic et al. ........... 706/12  |
| 7,783,114 | B2 | * | 8/2010  | Bradski et al. ............ 382/224  |
| 2007/0208516 | A1 | * | 9/2007  | Kutsyy et al. ............. 702/19   |
| 2007/0288417 | A1 | * | 12/2007 | Aggarwal et al. ........... 706/52   |
| 2009/0319244 | A1 | * | 12/2009 | West et al. ............... 703/11   |

OTHER PUBLICATIONS

Sutton, "Classification and regression trees, bagging, and boosting", Handbook of Statistics, 2005, pp. 303-329.*
Tong et al., "Decision forest: combining the predictions of multiple independent decision tree models", American chemical society, 2003, pp. 525-531.*
Svetnik et al., "Randon forest: a classification and regression tool for compound classification and QSAR modelling", American chemical society, 2003, pp. 1947-1958.*
Breiman, "Bagging predictors", Machine Learning, 1996, pp. 123-140.*
Breiman, "Random Forests", Univeristy of California, 2001, pp. 1-33.*

(Continued)

*Primary Examiner* — Omar Fernandez Rivas
(74) *Attorney, Agent, or Firm* — James S. Tak (57) ABSTRACT

A hybrid machine learning methodology and system for classification that combines classical random forest (RF) methodology with discriminant analysis (DA) techniques to provide enhanced classification capability. A DA technique which uses feature measurements of an object to predict its class membership, such as linear discriminant analysis (LDA) or Andersen-Bahadur linear discriminant technique (AB), is used to split the data at each node in each of its classification trees to train and grow the trees and the forest. When training is finished, a set of n DA-based decision trees of a discriminant forest is produced for use in predicting the classification of new samples of unknown class.

13 Claims, 7 Drawing Sheets

OTHER PUBLICATIONS

R.A. Fisher, "The Use of Multiple Measurements in Taxonomic Problems," Annals of Eugenics, vol. 7, pp. 179-188, 1936.

Anderson, T.W., et al., "Classification into Two Multivariate Normal Distributions with Different Covariance Matrices," Annals of Mathematical Statistics 33, 1962, pp. 420-431.

Breiman, L., "Random Forrests," Machine Learning, vol. 45, No. 1, 2001, pp. 5-32.

Fisher, R.A., "The Use of Multiple Measurements in Taxonomic Problems," Annals of Eugenics, vol. 7, 1936, pp. 179-188.

Ho, "Random Decision Forests," Third Int'l Conf. on Document Analysis and Recognition, 1995, pp. 278-282.

Ho, T.K., The Random Subspace Method for Constructing Decision Forests, IEEE Transactions on Pattern Analysis and Machine Intelligence, vol. 20, No. 8, 1998, pp. 832-844.

Rodriguez, J.J., et al., "Rotation Forest: A New Classifier Ensemble Method," IEEE Transactions on Pattern Anaylsis and Machine Intelligence, vol. 28, No. 10, 2006, pp. 1619-1630.

\* cited by examiner

DISCRIMINANT FOREST CLASSIFICATION METHOD AND SYSTEM

CLAIM OF PRIORITY IN PROVISIONAL APPLICATION

This application claims the benefit of U.S. Provisional Application No. 61/050,796 filed May 6, 2008, entitled, "Discriminant-based Random Forest" by Tracy Lemmond et al, and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to machine learning methodologies for classification, and in particular to a hybrid approach which combines classical random forest methodology with discriminant analysis techniques, such as linear discriminant analysis and Anderson-Bahadur linear discriminant technique.

BACKGROUND OF THE INVENTION

Classification is a statistical process used to partition a collection of items (e.g. data samples) into homogeneous classes according to their measurable characteristics, or features. Generally speaking, a typical classifier (i.e. a computerized system for performing classification, and often referring to the classification methodology itself) is first trained to recognize and label key patterns in a set of available training samples, and is then used to predict the class membership of future data.

Classifiers, however, are known to take many different forms and make a variety of assumptions that impact their effectiveness when applied to specific problem domains. Some of the issues that arise from these assumptions include: (a) what is the impact of selecting specific distributional models of the data and error processes (e.g., does performance gracefully degrade as the assumptions become increasingly less valid, or is failure catastrophic)?; (b) is the methodology robust to data degradation, including the effects of noisy, correlated, sparse, or missing data?; (c) does the technique readily accommodate different types of data (e.g., interval-ratio, ordinal, categorical, scalar, non-scalar, etc)?; (e) is there resistance to overtraining?; (f) does the methodology explicitly incorporate identified error costs?; (g) what is the ease of use (e.g., are there extensive parametric tuning requirements)?; (h) are posterior probabilities generated whose presence impact both interpretability and confidence assessment?; (i) how computationally efficient is the technique? (specifically, does it readily scale and effectively accommodate large data sets?; and (j) is training an off-line process only or do in-line variants exists.

While many machine learning approaches to classification have been previously developed that address some of these issues, selection of the ideal classifier still relies heavily upon the problem domain, the nature of the underlying data, and the solution requirements imposed by the analyst or by the problem domain itself. Hence, no classifier can be said to outperform all others in all cases. That said, a classifier and classification methodology that successfully addresses most or all of the aforementioned issues in some fashion is highly desirable for general, practical use. Several previously developed classifiers and classification methodologies include, for example: regularized discriminant analysis (RDA); flexible discriminate analysis (FDA); neural networks; and support vector machines (SVMs).

Random Forest Methodology

One of the most recent advances in classification is the random forest (RF) methodology, which is a non-parametric ensemble approach to machine learning that uses bagging to combine the decisions of multiple classification trees to classify data samples. The random decision forest concept was first proposed by Tin Kam Ho of Bell Labs in 1995 (see [Ho1995]), and later extended and formalized by Leo Breiman, who coined the more general term random forest to describe the classification approach (see [Breiman2001]). As used herein and in the claims, the terms "random forest," "random forest methodology," and "RF" refer to the classification concept generally disclosed in the [Breiman2001] reference, and not to the statistical analysis software sold under the trademark RANDOM FORESTS®.

Of the many classifiers that have been developed, few have addressed the aforementioned issues as effectively as the RF, which has been demonstrated to be highly accurate, robust, easy to use, and resistant to overtraining, and to produce posterior class probabilities that enable intuitive interpretation of results. RFs readily address numerous issues that frequently complicate and impact the effectiveness of other classification methodologies leveraged across diverse application domains. In particular, the RF requires no simplifying assumptions regarding distributional models of the feature data and error processes. Thus, there are fewer restrictions on the applications and conditions in which the RF can be effectively applied. Moreover, it easily accommodates different types of data since there are no model parameters that must be estimated from the data. Hence, the RF can be viewed as a nonparametric classification/detection methodology. In modern statistical analysis, this is a highly desirable trait, since parameter estimation is frequently complicated by issues related to data sparseness and imbalance, incorrectly specified models that cause bias or inflated variance, etc. Furthermore, RF is highly robust to overtraining with respect to forest size. As the number of trees in the RF increases, the generalization error, PE*, has been shown to converge and is bounded as follows, $$PE^* \leq \frac{\bar{\rho}(1-s^2)}{s^2} \quad (1)$$

$$s = 1 - 2 \cdot PE^*_{tree} \quad (2)$$

where $\bar{\rho}$ denotes the mean correlation of tree predictions, s represents the average strength of the trees, and $PE^*_{tree}$ is the expected generalization error for an individual tree classifier (it is implicitly assumed that $\bar{\rho} \in [0, 1]$ and $s \in (0, 1]$).

Bagging. From Eq. (1), it is apparent that the bound on generalization error decreases as the trees become stronger and less correlated. To reduce the mean correlation, $\bar{\rho}$, among trees in the forest, growth of the trees is generally randomized by using a technique called bagging, in which each tree is trained on a bootstrapped sample of the original training data set, which is typically referred to as its bagged training set. Even though each bagged training set (i.e. tree training set) contains the same number of samples as the original training data (i.e. forest training set), its samples are randomly selected with replacement and are representative of approximately two-thirds of the original data. The remaining samples are generally referred to as the out-of-bag (OOB) data and are frequently used to evaluate classification performance. In other words, for each tree, a tree training set of size N is randomly sampled (with replacement) from the original forest training set of size N. Thus, each tree will be trained on a set of data representative of approximately two-thirds of the original training set.

Node Splitting. At each node in a typical RF classification tree, m features are randomly selected from the available feature set, D, and the single feature producing the "best" split (according to some predetermined criterion) is used to partition the training data into classes. As stated in the [Breiman2001] reference, small values of m, referred to as the split dimension, relative to the total number of features are normally sufficient for the forest to approach its optimal performance. Large values of m may increase the strength of the individual classification trees, but they also generally induce higher correlation among them, potentially reducing the overall effectiveness of the forest. It is notable that a typical RF node split is a univariate decision, based upon a single feature preferentially selected from a preferably small set of m randomly selected features. Such node splits are locally suboptimal due to the randomness injected by the feature selection scheme. However, this approach encourages diversity among the trees, ultimately improving the classification performance of the forest as a whole. Most efforts to enhance random forests have sought to inject additional randomness into the algorithm while preserving the strength of individual classifiers.

Prediction. Each tree in the forest is grown to the greatest extent possible, i.e. it is grown without pruning until the data at its leaf nodes (i.e. terminal nodes) are homogeneous (i.e. all samples are of a single class), or until some other predefined stopping criterion is satisfied. When the forest has been fully constructed, class predictions are then performed by propagating a new test sample through each tree and assigning a class label, or vote, based upon the leaf node that receives the sample. Typically, the sample is assigned to the class receiving the majority vote, although various voting thresholds may be used to tune the resulting error rates. It is notable that the resulting votes can be viewed as approximately independently and identically distributed (i.i.d.) random variables, and thus, the Laws of Large Numbers imply that the corresponding relative frequencies will converge to the true class-specific probabilities as the number of trees in the forest increases. Moreover, the empirical distribution function from which they are drawn will converge to the true underlying distribution function. Hence, the resulting relative frequencies of votes effectively estimate the true class-specific probabilities and we can threshold upon this distribution to make a classification decision. In other words, the class assignment frequencies resulting from this process can be interpreted as posterior class probabilities.

Random Forest Hybrids and Variants

The desirable characteristics of the random forest paradigm have inspired numerous variations and hybrids of this approach to be developed in an effort to enhance the ensemble classifier, with varying success. Because the performance of the random forest method has been shown to depend wholly upon the strength of its individual trees as classifiers and the correlation among them, as suggested by Eq. (1), enhancements to RF methodology have generally proceeded with an emphasis upon increasing the diversity of the tree classifiers while maintaining a high average strength. Example variations of random forests include, for example: Gini Impurity-based Node Splitting; Rotation Forests (and other techniques that involve a transformation of the feature data prior to building the forest); and CART forests and Logistic regression forests (i.e. forests that use alternative base classifiers).

Gini Impurity-based Node Splitting. As described above for the classical RF method, m features are randomly selected at each node, and the single feature that produces the "best" split of the data is computed. While numerous measures have been used to determine the "best" split (e.g., misclassification error, entropy), one popular criterion for node splitting in RFs is based upon Gini impurity, which measures the homogeneity (i.e., purity) of tree nodes. In training a typical decision tree, the ultimate goal is to partition the data into homogeneous regions that can be assigned a predicted class label. Hence, at a given node t, what is sought is the single feature and threshold that maximize the decrease in Gini impurity, which is given by:

$$\Delta I_G(x_j, t) = I_G(t) - \hat{p}_{tL} I_G(tL) - \hat{p}_{tR} I_G(tR) \quad (3)$$

where $$I_G(t) = \sum_{i=1}^{numClasses} \hat{p}_{ti}(1 - \hat{p}_{ti}) \quad (4)$$

$\hat{p}_{ti}$ is the probability of class i estimated from the samples in node t; $\hat{p}_{tL}$ and $\hat{p}_{tR}$ are the proportion of data samples in node t that fall into its left and right child nodes, respectively, based on the split induced by the threshold $x_j$; and $I_G(tL)$ and $I_G(tR)$ are computed as in Eq. (4) for the left and right child nodes, respectively.

Rotation Forests (and other techniques that involve a transformation of the feature data prior to building the forest). The Rotation Forest, described in the [Rodriguez2006] reference, is a random forest variant that uses Principal Component Analysis (PCA) to transform the training data prior to training the forest. Specifically, to create the training data for a single tree classifier, the feature set is randomly split into K subsets, and PCA is applied to each subset. All principal components are retained in order to preserve the variability information in the data. Thus, K axis rotations take place to form the new features for a single tree. Once the training data set for a base classifier has been determined, the classifier is trained as in the conventional RF algorithm. Class prediction is performed using the new transformed feature set.

CART forests, Logistic regression forests (i.e., forests that use alternative base classifiers). Because the ensemble paradigm leveraged by the RF is highly effective (i.e., the RF significantly outperforms a single tree classifier), many variations on this theme have been developed that utilize an alternative base classifier. For example, classification and regression trees (CARTs), support vector machines (SVMs), and logistic regression models have all been incorporated into an ensemble to improve performance (see [Ho1998]). Such efforts have generally met with limited success. Though each of these individual classifiers is more effective than the typical RF tree, this distinction does not guarantee a more effective ensemble classifier.

SUMMARY OF THE INVENTION

One aspect of the present invention includes a hybrid random forest (RF) and discriminant analysis (DA) method of training a computerized system to predict the class membership of a sample of unknown class, comprising: providing a forest training set to the computerized system comprising N feature vector ($\hat{x}_i$) and class label ($\hat{y}_i$) pairs ($\hat{x}_i \in \Re^D, \hat{y}_i \in \{0,1\}$) for i=1 to N, and from D available features; and controlling the computerized system to repeat the following set of steps until a desired forest size having n decision trees has been reached: adding a decision tree to the forest, creating a tree training set associated with the added decision tree, said tree training set comprising N bootstrapped training samples randomly selected with replacement from the forest training set, and using the tree training set to train the added decision tree by using hierarchical DA-based decisions to perform splitting of decision nodes and thereby grow the added decision tree as a DA-based decision tree, whereby, upon reaching the desired forest size, the computerized system may predict the classification of a sample of unknown class using the n DA-based decision trees.

Another aspect of the present invention includes a hybrid random forest (RF) and discriminant analysis (DA) method of predicting the classification of a sample of unknown class, comprising: providing a forest-trained computerized system trained according to claim 1 with n DA-based decision trees; causing the forest-trained computerized system to: receive as input one or more samples of unknown class, characterized as sample feature vector(s) x; for each of the n DA-based decision trees and beginning with the root node of each decision tree, (a) determining if the current decision node is terminal; (b) if the current decision node is terminal, assigning x to the class of the current decision node and returning to step (a) for the next decision tree; (c) if the current decision node is not terminal, computing f(x')=wTx'+b for the current decision node, determining if f(x') is greater than or equal to 0, selecting the left child node as the new current decision node if f(x')≧0, selecting the right child node as the new current decision node if f(x')<0, and returning to step (a) for the current decision tree; computing the relative frequency of class assignments for x in the n DA-based decision trees; based on a predetermined threshold value, determining a final class prediction based on the relative frequency of class assignments in the n DA-based decision trees; and providing the final class prediction to a user.

Another aspect of the present invention includes a hybrid random forest (RF) and discriminant analysis (DA) method-based computerized system for predicting the classification of a sample of unknown class, comprising: computer input means for receiving one or more samples of unknown class, characterized as sample feature vector(s) x; computer processor means trained according to claim 1 with n DA-based decision trees, wherein for each of the n DA-based decision trees and beginning with the root node of each decision tree the computer processor means is adapted to: (a) determine if the current decision node is terminal; (b) if the current decision node is terminal, assigning x to the class of the current decision node and returning to step (a) for the next decision free; (c) if the current decision node is not terminal, computing f(x')=wTx'+b for the current decision node, determining if f(x') is greater than or equal to 0, selecting the left child node as the new current decision node if f(x')≧0, selecting the right child node as the new current decision node if f(x')<0, and returning to step (a) for the current decision tree; computer processor means for computing the relative frequency of class assignments for x in the n DA-based decision trees; computer processor means for, based on a predetermined threshold value, determining a final class prediction based on the rela-tive frequency of class assignments in the n DA-based decision trees; and computer output means for providing the final class prediction to a user.

Splitting Decision Nodes via Discriminant Analysis (DA) Techniques, Generally

Generally, the present invention is directed to a hybrid machine learning methodology for classification (i.e. a classifier) that combines classical random forest (RF) methodology with discriminant analysis (DA) techniques to provide enhanced classification capability. In particular, the present invention incorporates DA techniques to split the data at each node in each of its classification trees to grow the trees and the forest, and is therefore characterized herein as the Discriminant Forest (DF) methodology. Two exemplary types of DA techniques used in the DF methodology of the present invention include linear discriminant analysis (LDA) and Anderson-Bahadur linear discriminant technique (AB). When grown according to the training methodology of the present invention, a discriminant forest comprising a set of n DA-based decision trees is produced for use in predicting the classification of a new sample of unknown class.

The DA-based node-splitting approach of the DF method of the present invention has been shown in empirical tests performed by Applicants at the Lawrence Livermore National Laboratory to produce forests which have consistently outperformed other classifiers (i.e. produced lower classification error rates when performing detection/classification tasks), including the classical RF method. This is despite the fact that such DA methodologies add additional complexity and structure to the node splitting process, as well as being restrictive due to its assumption that the data distribution is multivariate normal, and in the particular case of LDA, its assumption of equal covariance structures for the classes of interest.

DA techniques, like other known classification methodologies, use feature measurements of an object to predict its class membership. Unlike the random forest, whose trees use hierarchical decisions to partition the feature space into successively smaller regions, DA techniques assume an underlying discriminant model whose parameters must be simultaneously estimated to produce the best possible separation of classes within feature space. In practice, linear and quadratic discriminant models are frequently used, assuming an underlying multivariate normal data distribution. In the quadratic case (i.e., quadratic discriminant analysis, QDA), the discriminant function (or rule) is defined for each class k by $$d_k(x) = -\frac{1}{2}(x-\mu_k)^T S_k^{-1}(x-\mu_k) - \frac{1}{2}\ln|S_k| + \ln\pi_k \quad (5)$$

where $\mu_k$ and $S_k$ are the mean vector and covariance matrix for class k, respectively, and $\pi_k$ is its prior probability. The discriminant rule for each class transforms a multivariate feature vector into a discriminant value that reflects its similarity to members of class k. Hence, a feature vector, x, is assigned to the class for which $d_k(x)$ is maximized.

Splitting Decision Nodes via Linear Discriminant Analysis (LDA)

In the two-class case, the function $d(x)=d_1(x)-d_0(x)=0$ defines a quadratic decision boundary (i.e., parabolic, elliptical, or hyperbolic) that separates the two classes. Under the assumption of equal class covariances, d(x) reduces to a linear decision boundary. This approach is called Linear Discriminant Analysis (LDA), and was pioneered by R. A. Fisher (see [Fisher1936]). Generally, LDA is a discrimination technique that utilizes dimensionality reduction to classify items into two groups. Basically, the LDA approach makes class assignments by determining the linear transformation of the feature data that maximizes the ratio of the between-class variance to the within-class variance, resulting in the greatest separation between the classes. The result is a linear decision boundary that is optimal (in a Bayesian sense) when the underlying assumptions of multivariate normality and equal covariance matrices are satisfied. In a first preferred embodiment of the present invention, decision node splitting is performed using LDA, i.e. LDA-based decisions are used to split a non-terminal decision node (i.e. not a leaf node) into two decision nodes of a next level.

It can be shown that, in the two-class case, the maximum class separation occurs when the vector of coefficients, w, and intercept, b, used to define the linear transformation, $w^T x+b$, (where x is a coordinate in feature space) are as follows $$w = S^{-1}(\mu_1 - \mu_0) \quad (6)$$

$$b = -0.5^*(\mu_1 + \mu_0)^T S^{-1}(\mu_1 - \mu_0) + \log\left(\frac{\pi_1}{\pi_0}\right). \quad (7)$$

where $S^{-1}$ is the common covariance matrix, $\mu_k$ is the mean vector for the $k^{th}$ class, and $\pi_k$ is the prior probability of the $k^{th}$ class. Typically, when data is limited, $S^{-1}$ is estimated by the pooled covariance estimate, $S_W$, given by $$S_W = \sum_{i=1}^{N} S_k \quad (8)$$

$$S_k = \sum_{i=1}^{N_k} (x_{ki} - \mu_k)(x_{ki} - \mu_k)^T \quad (9)$$

where $x_{ki}$ denotes the $i^{th}$ training sample of the $k^{th}$ class, and $\mu_k$ denotes the corresponding class sample mean of the $k^{th}$ class.

Typically when LDA is used as a standalone classifier, it is applied to data sets with sufficient non-dependent feature data in at least one class to yield a nonsingular pooled covariance estimate. The technique requires the inversion of this matrix to compute the discriminant function for class assignment. Used in the discriminate forest (DF) of the present invention, however, such a discriminant function is preferably computed at each node within each tree. Efficiency may not be at issue in most cases, particularly when the number of features considered at each node, m, is small. However, classification trees in a RF are typically grown to the greatest extent possible, and the same is true for the DF of the present invention. Frequently, near zero variance for both classes will likely be encountered particularly near the leaves of a tree, and therefore it is likely that nearly singular covariance matrices will also be encountered.

In order to handle these situations, one exemplary embodiment of the present invention incorporates a metric called the condition number, κ, for determining whether a matrix is nearly singular. In order to compute the condition number for a matrix, $A_{n \times n}$, the eigenvalues of the product of A with its conjugate transpose, AA, must first be determined which, for real matrices, is equal to the transpose of A. Since A is a pooled covariance matrix and is therefore symmetric, only the eigenvalues ($\lambda_i$, i=1, ..., n) of AA need to be found. The condition number, then, is given by $$\kappa = \frac{\sqrt{|\lambda_{max}|}}{\sqrt{|\lambda_{min}|}}, \text{ where } \sqrt{|\lambda_i|}, i = 1, \ldots, \quad (10)$$

n are the singular values of AA

A large condition number indicates that a matrix is numerically ill-conditioned and either cannot be inverted, or inversion will lead to numerical instability. When this condition occurs at a node, rather than fit a decision boundary via LDA, a perpendicular bisector is fitted between the class means. It is notable that this problem is not limited to leaf nodes. For non-leaf nodes with large amounts data, the covariance matrix may not be invertible if some features are highly correlated. Therefore to mitigate this issue, features are first preferably culled prior to performing any analysis using this methodology. The elimination of redundant features is always recommended prior to the application of any classifier methodology.

Empirical tests have shown that, like the original RF ensemble classifier, the LDA-based, discriminant forest or the present invention exhibits performance superior to other methods, including support vector machines, neural networks, RDA, and FDA. In nearly all cases, the LDA-based discriminant forest outperformed the classic RF approach.

Splitting Forest Nodes via Anderson-Bahadur

The Anderson-Bahadur Linear Discriminant technique (AB), originally developed by Anderson and Bahadur [Anderson1962], is another exemplary linear discrimination technique (like LDA) for classifying items into two distinct categories. In another exemplary embodiment of the present invention, the AB method is used to split the data at each node in each of its classification trees.

AB is similar to the Linear Discriminant Analysis (LDA) technique in that it shares the same multivariate normality assumption on the distribution of the data. Unlike LDA, however, AB assumes that the covariance matrices are unequal. Thus, the AB algorithm yields the optimal linear decision boundary separating two classes, given the assumption of multivariate normality with unequal covariance matrices. The optimal linear decision boundary is given by:

$$w^T x + b \quad (11)$$

where x is a coordinate in feature space, $$w = S^{-1}(\mu_1 - \mu_0) \quad (12)$$

$$b = -\frac{w^T \mu_0 (w^T S_1 w)^{1/2} + w^T \mu_1 (w^T S_0 w)^{1/2}}{(w^T S_0 w)^{1/2} + (w^T S_1 w)^{1/2}}. \quad (13)$$

In the above equations, $\mu_k$ and $S_k$ are the sample mean and covariance of the $k^{th}$ class, respectively, given by:

$$S_k = \frac{1}{N_k - 1} \sum_{i=1}^{N_k} (x_i - \mu_k)(x_i - \mu_k)^T \quad (14)$$

$$\mu_k = \frac{1}{N_k} \sum_{i=1}^{N_k} x_i \quad (15)$$

Unlike the pooled covariance estimate used by the LDA, AB's weighted pooled class covariance matrix, $S_W$, is computed with potentially unequal class weights. In AB, $S_W$ is computed via $$S_W = \lambda S_0 + (1-\lambda) S_1 \qquad (16)$$

The Anderson and Baladur reference [Anderson1962] describes several ways to compute the weighting factor, $\lambda$. One particular method for computing $\lambda$ utilized in the present invention, minimizes the maximum probability of error, yielding the following optimization criterion for computing $\lambda$:

$$\lambda = \underset{\lambda}{\operatorname{argmax}} \left\{ \frac{w^T (\mu_1 - \mu_0)}{(w^T S_0 w)^{1/2} + (w^T S_1 w)^{1/2}} \right\} \qquad (17)$$

This approach requires covariance matrix inversion. Therefore, here also similar to the LDA-based node splitting, a metric called the condition number, $\kappa$, is incorporated for determining whether a matrix is nearly singular (non-invertible). In order to compute the condition number for a matrix, $A_{n \times n}$, the eigenvalues of the product of A with its conjugate transpose, AA, must first be determined which, for real matrices, is equal to the transpose of A. Since A is a pooled covariance matrix and is therefore symmetric, only the eigenvalues, $(\lambda_i, i=1, \ldots, n)$, of AA need to be found. The condition number, then, is given by $$\kappa = \frac{\sqrt{|\lambda_{max}|}}{\sqrt{|\lambda_{min}|}}, \qquad (18)$$

where $\sqrt{|\lambda_i|}$, $i = 1, \ldots, n$ are the singular values of $AA$

A large condition number indicates that a matrix is numerically ill-conditioned and either cannot be inverted, or inversion will lead to numerical instability. When this condition occurs at a node, rather than fit a decision boundary AB, we fit a perpendicular bisector between the class means. This results in a decision boundary defined by (1), where:

$$w = \mu_1 - \mu_0 \qquad (19)$$

$$b = -\frac{1}{2}(\mu_1 - \mu_0)^T (\mu_0 + \mu_1) \qquad (20)$$

Thus, in a tree node where $S_W$ is near-singular (i.e., numerically ill-conditioned), the perpendicular bisector between the class means may be used as the linear decision boundary. In such cases, the linear transformation is defined by Eqs. (19) and (20).

Like the LDA-based node splitting previously described, empirical tests have shown that, like the original RF ensemble classifier, the AB-based, discriminant forest method of the present invention exhibits performance superior to other methods, including support vector machines (SVMs), neural networks, RDA, and FDA. In nearly all cases, the AB-based discriminant forest outperformed the classic RF approach.

Exemplary Data Source and Applications

The discriminant forest method of the present invention is suited for applications that require the ability to discriminate two classes of interest (e.g. signals, signatures or objects) from each other based upon a collection of measurable features. The DF classification method can be applied to any data consisting of tuples or feature vectors of continuous or discrete numbers. Given a training set consisting of feature vectors labeled as belonging to one class or another, the classification algorithms are able to automatically predict the class membership of a new feature vector. Because DF produces significantly lower error rates, it may be particularly valuable for applications in which errors can prove costly, such as medical and financial. The following is a representative list of example applications capable of using the DF of the present invention, including but not limited to the following:

Healthcare. Detection of diseases from X-Ray images, e.g. cancers, infections, coronary blockages. Detection of diseases from CT scans/magnetic resonance imaging. Assessment of potential for developing various diseases based on patient history and metrics (e.g., height, weight, blood pressure, temperature, cholesterol, blood sugar, etc.) Diagnosis of diseases based upon observed symptoms.

Finance. Assessment of credit-worthiness of individuals based upon metrics like income, monthly debt, number of credit lines open, etc. Assessment of tax law compliance based upon metrics like deductions and amounts taken, income, past earnings and behaviors, etc. Predicting consumer purchases based on past history of consumer purchases and other consumer metrics.

Defense/Homeland Security/Counter-terrorism. Detection of shielded radiological sources from gamma ray spectra. Detection of chemical sources/releases. Pathogen detection. Standoff detection of explosives based on Raman spectroscopy. Biometric identification based on, for example: images of faces, recordings of voice, fingerprints, gestures/gait. Identification of important concepts from collected texts. Explosives detection from X-Rays.

Computer/Information Technologies (including cyber-security). Detection of intrusions/infiltration on computer networks. Detection of malicious code on computers. Detection of covert channels of communication over computer networks. Predicting whether a user will access a given website or web ad given a history of the user's past accesses.

Remote Sensing. Detection of chemicals in atmosphere based on various spectral measurements. Detection of land types based on overhead images. Detection of buildings, vehicles, structures, roads, and landmarks from overhead images. Obstacle avoidance (cars, planes, etc).

Manufacturing. Industrial parts inspection (including assembly line) to detect flaws and increase quality.

System aging/failure source detection. Detection of defects on laser optics from images. Airframe inspection to detect emerging flaws indicative to potential failure. Infrastructure (e.g., tunnels, bridges, dams, buildings) inspection detect emerging flaws indicative to potential failure.

In addition, other illustrative applications may include: hidden signal detection; seismic event/explosion discrimination and analysis; law enforcement: deployment strategies, hot spot detection/prediction, handwriting identification; speech recognition/speaker identification; natural language processing: document classification, POS tagging, semantic analysis.

REFERENCES

The following references, cited herein, are incorporated by reference:

[Anderson1962] T. W. Anderson and R. P. Bahadur, "Classification into Two Multivariate Normal Distributions with Different Covariance Matrices," *Annals of Mathematical Statistics* 33, pp. 420-431, 1962.

[Breiman2001] L. Breiman, "RFs", Machine Learning, vol. 45, no. 1, pp. 5-32, 2001.

[Fisher1936] R. A. Fisher, "The Use of Multiple Measurements in Taxonomic Problems," *Annals of Eugenics*, vol. 7, pp. 179-188, 1936.

[Ho1995] T. K. Ho, "Random Decision Forest", in *Proc. of the 3rd International Conference on Document Analysis and Recognition*, pp. 278-282, 1995.

[Ho1998] T. K. Ho, "The Random Subspace Method for Constructing Decision Forests", *IEEE Trans. on Pattern Analysis and Machine Intelligence*, vol. 20, no. 8, pp. 832-844, 1998.

[Rodriquez2006] J. J. Rodriguez, L. I. Kuncheva, and C. J. Alonso, "Rotation Forest: A New Classifier Ensemble Method", *IEEE Trans. on Pattern Analysis and Machine Intelligence*, vol. 28, no. 10, pp. 1619-1630, 1998.

BRIEF DESCRIPTION OF THE DRAWINGS

The accompanying drawings, which are incorporated into and form a part of the disclosure, are as follows.

DETAILED DESCRIPTION

Figure 1:
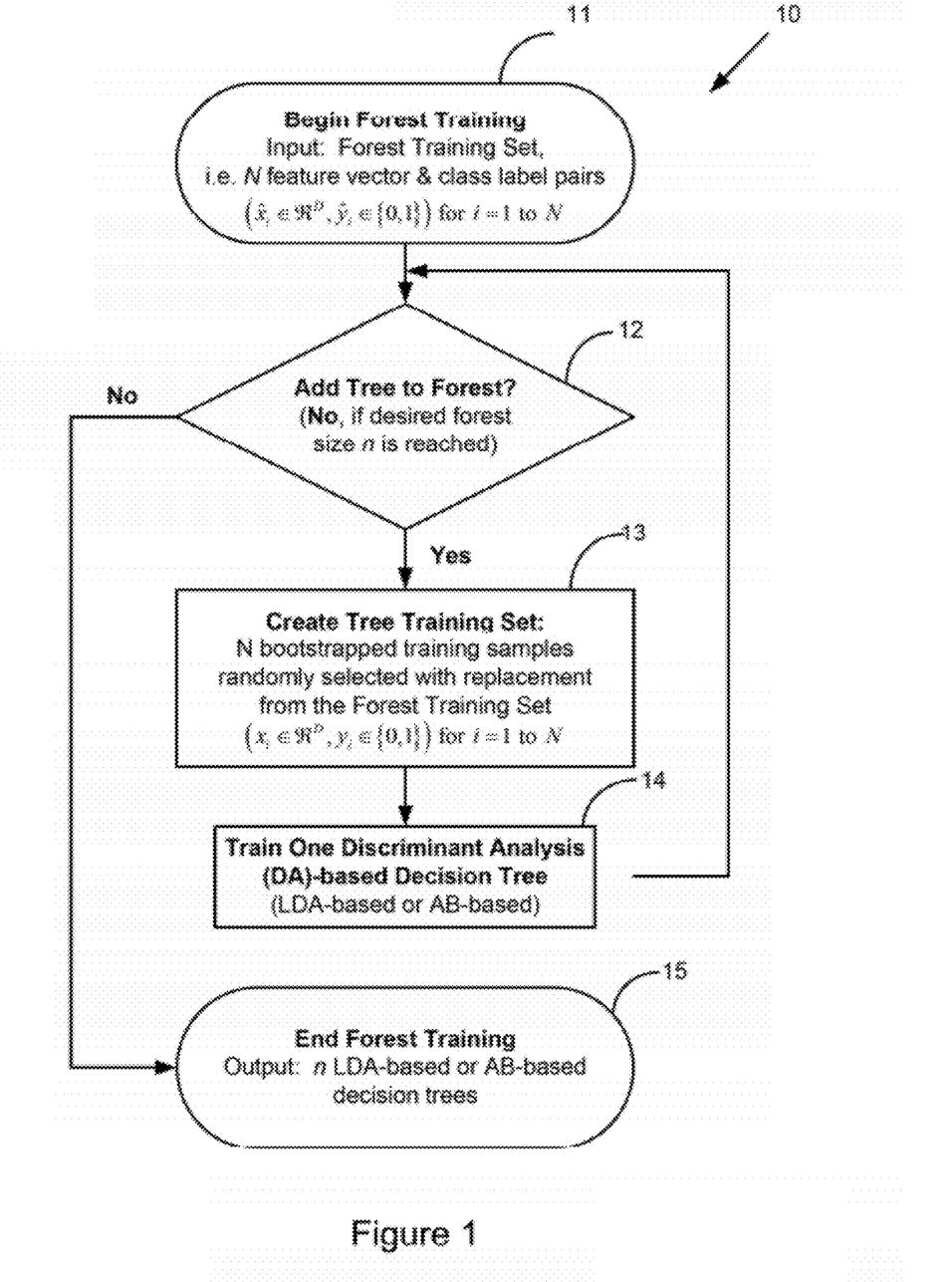
FIG. 1 shows a flowchart of an exemplary forest training method used in the Discriminant Forest methodology of the present invention.

Turning now to the drawings, FIG. 1 generally shows a flowchart of an exemplary forest training method, indicated at reference character 10, used in the discriminant forest (DF) classification methodology and system of the present invention. Forest training begins at block 11, where a forest training set is first provided to a computerized system (not shown) for training the computerized system. In particular, the forest training set includes N feature vector and class label pairs, $(\hat{x}_i \in \Re^D, \hat{y}_i \in \{0,1\})$ for i=1 to N, where $\hat{x}_i$ is the feature vector selected from the available feature set, D, and ŷ, is the class label. It is appreciated that the forest training set may be provided in various ways, for example, as input from a user via a command-line or graphic user interface, or via access from a database having the forest training set stored thereon in a manner known in the art.

Next, at block 12, a determination is made whether to add a tree to the forest based on whether a desired forest size n has been reached or not.

If the desired forest size has not been reached, a new decision tree is added to the forest, and the algorithm proceeds to blocks 13 and 14. In this case, a tree training set is created at block 13 for training the added decision tree. In particular, as shown in block 13, N bootstrapped training samples are randomly selected with replacement from the forest training set to create the tree training set, $(x_i \in \Re^D, y_i \in \{0,1\})$ for i=1 to N. As previously discussed in the Background, this technique is called bagging and is used to randomize growth of the trees. Even though each bagged training set (i.e. the tree training set) contains the same number of samples as the original training data (i.e. forest training set), its samples are randomly selected with replacement and are representative of approximately two-thirds of the original data.

And upon creating the tree training set, the added decision tree is then trained at block 14, which involves splitting tree nodes (i.e. decision nodes) and growing the tree. In particular, as will be described in FIGS. 2 and 3 (for LDA-based node splitting) and in FIGS. 5 and 6 (for AB-based node splitting), splitting of decision nodes is performed using a discriminant analysis (DA)-based technique, such as LDA or AB. In any case, upon completing training of the added decision tree, control is returned to block 12 to determine if additional trees are to be added and trained.

If in block 12 the desired forest size n has been reached, the algorithm proceeds to block 15 where forest training stops and n DA-based decision trees (either LDA-based or AB-based) of the discriminant forest are produced. At this point, the computerized system is trained and ready to perform classification using the n DA-based decision trees, as will be discussed for FIGS. 4 and 7. In one exemplary embodiment, the computerized system may be further controlled to report statistics associated with the n LDA-based decision trees to a user, such as in a text-based format or visual format. In another exemplary embodiment, the computerized system may be controlled to provide the n LDA-based decision trees as machine-readable code capable of being executable on a second computerized system for predicting the classification of a sample of unknown class on the second computerized system. It is appreciated in this case that the second computerized second would then be considered "trained" to perform classification predictions.

It is appreciated that the n DA-based decision trees of the discriminant forest produced in the course of training the computerized system, as well as the computerized system trained in accordance with the method described herein, may be embodied, implemented, and/or functionalized in various ways known in the computational arts, such as for example software, hardware, firmware, integrated circuits, FPGA etc., (and having processor, memory, etc.) by which unknown data samples may be provided as input to the discriminant forest for predicting the classification of a sample of unknown class. For example, the DF method, including the training and predicting functionalities, may be embodied as software executable on a general purpose computer having a processor, memory, storage, and user interface (input, output).

LDA-Based Node Splitting and Tree Training

Figure 2:
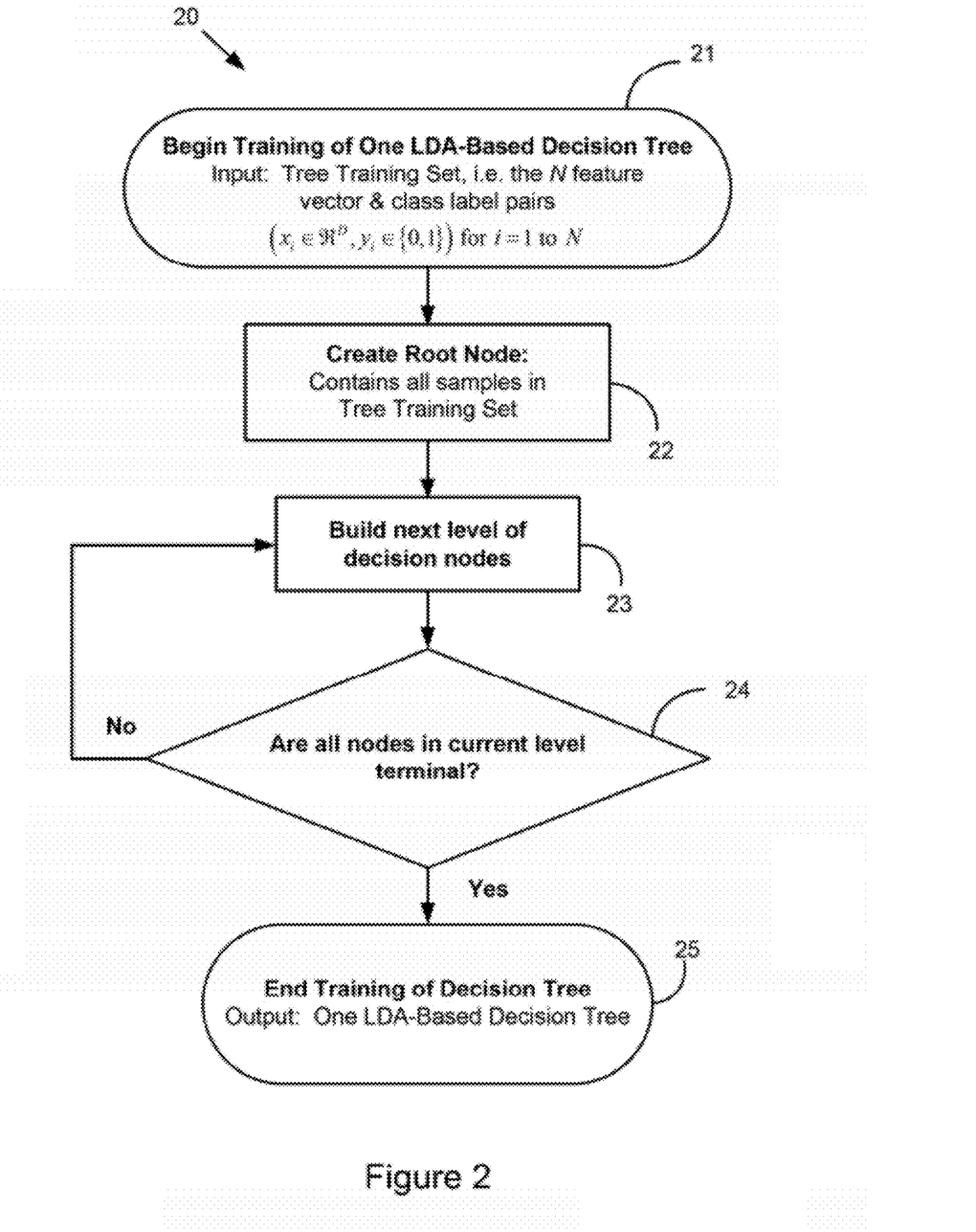
FIG. 2 shows a flowchart of a first exemplary LDA-based tree training method used in the Discriminant Forest methodology of the present invention.
Figure 3:
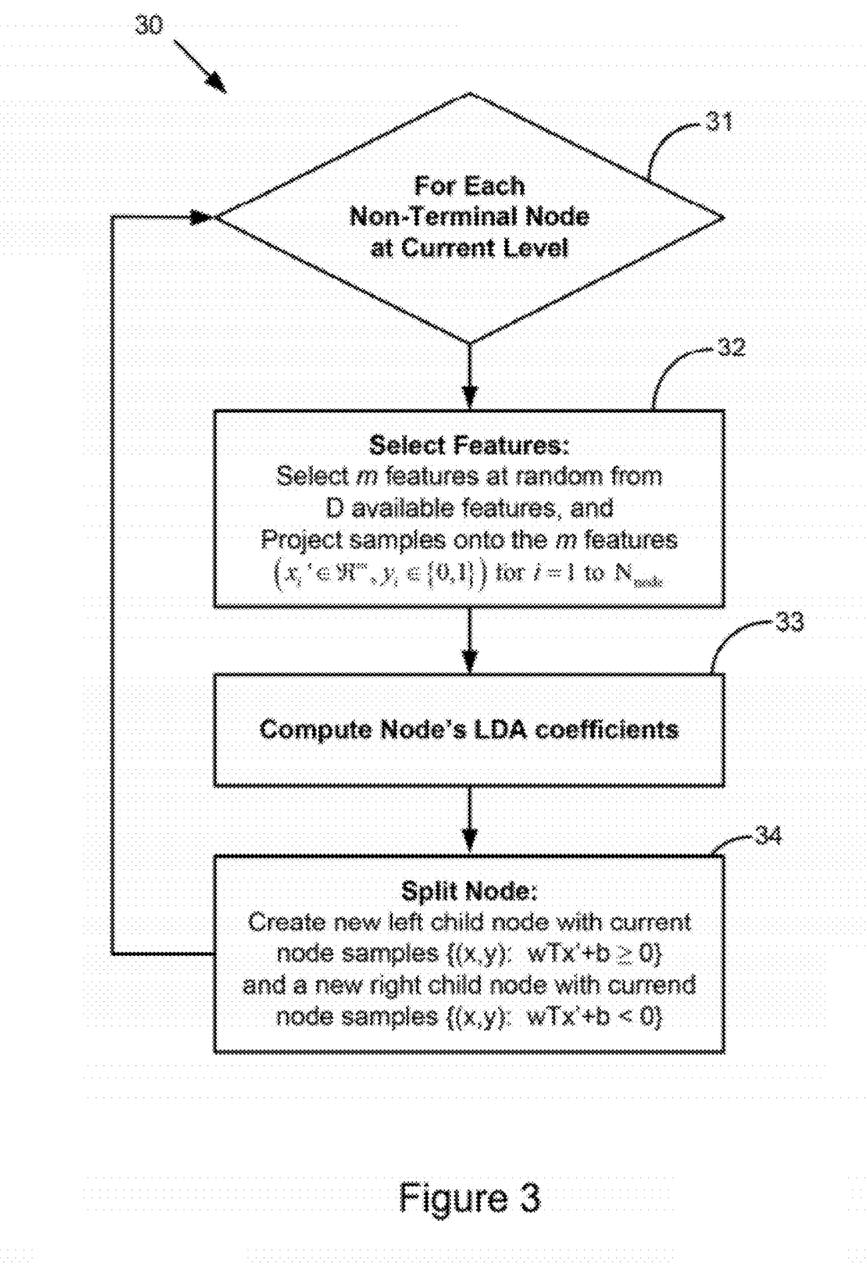
FIG. 3 shows a flowchart of an exemplary method for building a next level of decision nodes in an LDA-based decision tree.

FIGS. 2 and 3 next illustrate the first exemplary case of LDA-based node splitting employed in the tree training routine (block 14 of FIG. 1) of the DF classification method of the present invention. In particular, FIG. 2 shows a flowchart of a first exemplary LDA-based decision tree training method, generally indicated at reference character 20. At block 21, the LDA-based decision tree training begins for the newly added decision tree with the tree training set created in block 13 of FIG. 1. A root node is then created at block 22 containing all samples in the tree training set. At block 23, new levels of decision nodes are then built by node splitting using a discriminate analysis technique, such as LDA described in detail in FIG. 3. For purposes of node splitting, the root node is considered the first "current level," with subsequent current levels being progressively assigned to "next levels" of newly formed "child nodes." As indicated by the return arrow from block 24 to block 23, additional levels of tile decision tree are built by node splitting, until a determination is made at block 24 that all nodes in the current level are terminal, i.e. leaf nodes. It is appreciated that a decision node is terminal (i.e. a leaf node) if it is homogenous i.e. containing only samples of a single class, or some other predefined stopping criterion is satisfied, such as for example, containing fewer samples than a specified threshold, or exceeding a maximum count of decision nodes or tree levels (i.e. tree depth). If all nodes in the current level are terminal, then training of the added decision tree ends at block 25, and one LDA-based decision tree is produced.

FIG. 3 shows a flowchart of an exemplary method for building new levels of decision nodes in an LDA-based decision tree, and generally indicated at reference character 30. As such, 30 of FIG. 3 illustrates one exemplary method of performing block 23 in FIG. 2. Beginning at block 31, a determination is made whether a non-terminal node or nodes exist at the current level. If a non-terminal node or nodes exist, blocks 32-34 are performed for each of the non-terminal nodes. If no non-terminal nodes exist at the current level, all decision nodes are determined to be terminal at block 24 of FIG. 2, and the training for the particular decision tree ends. If non-terminal nodes are found, control transfer to block 32 where, for each non-terminal node at the current level, m features are selected at random from the D available features, and the samples are projected onto the m features. In this case, $(x_i' \in \Re^m, y_i \in \{0,1\})$ for i=1 to $N_{node}$.

Next at Block 33, LDA coefficients, w and b, are computed by the computerized system over all $N_{node}$ samples, $x_i$, contained in the non-terminal decision node projected onto the m features, $x_i'$, to form a linear decision boundary defined by the LDA coefficients. In particular, w, is typically computed from:

$$w = S^{-1}(\mu_1' - \mu_0') \quad (21)$$

and the intercept, b, is computed from:

$$b = -0.5^*(\mu_1' + \mu_0')^T S^{-1}(\mu_1' - \mu_0') + \log\left(\frac{\pi_1}{\pi_0}\right) \quad (22)$$

where:

$$S_W = S_0 + S_1 \quad (23)$$

$$S_k = \sum_{i=1}^{N_k} (x_{ki}' - \mu_k')(x_{ki}' - \mu_k')^T \quad (24)$$

$$\mu_k' = \frac{1}{N_{node}} \sum_{i=1}^{N_k} x_i' \quad (25)$$

$\pi_k$ is the prior probability of the $k^{th}$ class (26)

It is appreciated, however, as discussed in the Summary, that for a large condition number, κ, greater than a predetermined threshold value, the linear decision boundary is preferably a perpendicular bisector fitted between the class means. The condition number $$\kappa = \frac{\sqrt{|\lambda_{max}|}}{\sqrt{|\lambda_{min}|}},$$

and $\sqrt{|\lambda_i|}$, i=1, ..., n are the singular values of AA, which is the product of matrix $A_{n \times n}$ and its conjugate transpose. A large condition number indicates that a matrix is numerically ill-conditioned and either cannot be inverted, or inversion will lead to numerical instability. When this condition occurs at a node, rather than fit a decision boundary via LDA, a perpendicular bisector is fitted between the class means.

And at block 34, the samples of the non-terminal decision node ("parent node") are then split into two new decision nodes of a next level ("child nodes") by populating one of the child nodes with the samples of the parent node for which $f(x') = w^T x' + b \geq 0$ and the other child node with the samples of the parent node for which $f(x') = w^T x' + b < 0$.

For each terminal decision node of the current level of the added decision tree, the class of the terminal decision node is recorded as positive if its samples lie on the positive side of the linear decision boundary used to split its parent node. Otherwise the class of the terminal decision node is recorded as negative.

After node-splitting is performed for all non-terminal nodes of a current level at block 34, and all terminal nodes are recorded, the "current level" is reset to the level of the child nodes, if any, and control returns to block 31 to determine if any non-terminal nodes exist in the new current level. In this manner, the added decision tree is grown as a LDA-based decision tree. Additional decision trees that are added to the discriminant forest at block 12 of FIG. 1, may be similarly grown according to the LDA-based node splitting and tree training described in FIGS. 2 and 3, until a discriminant forest of n LDA-based decision trees is produced.

Figure 4:
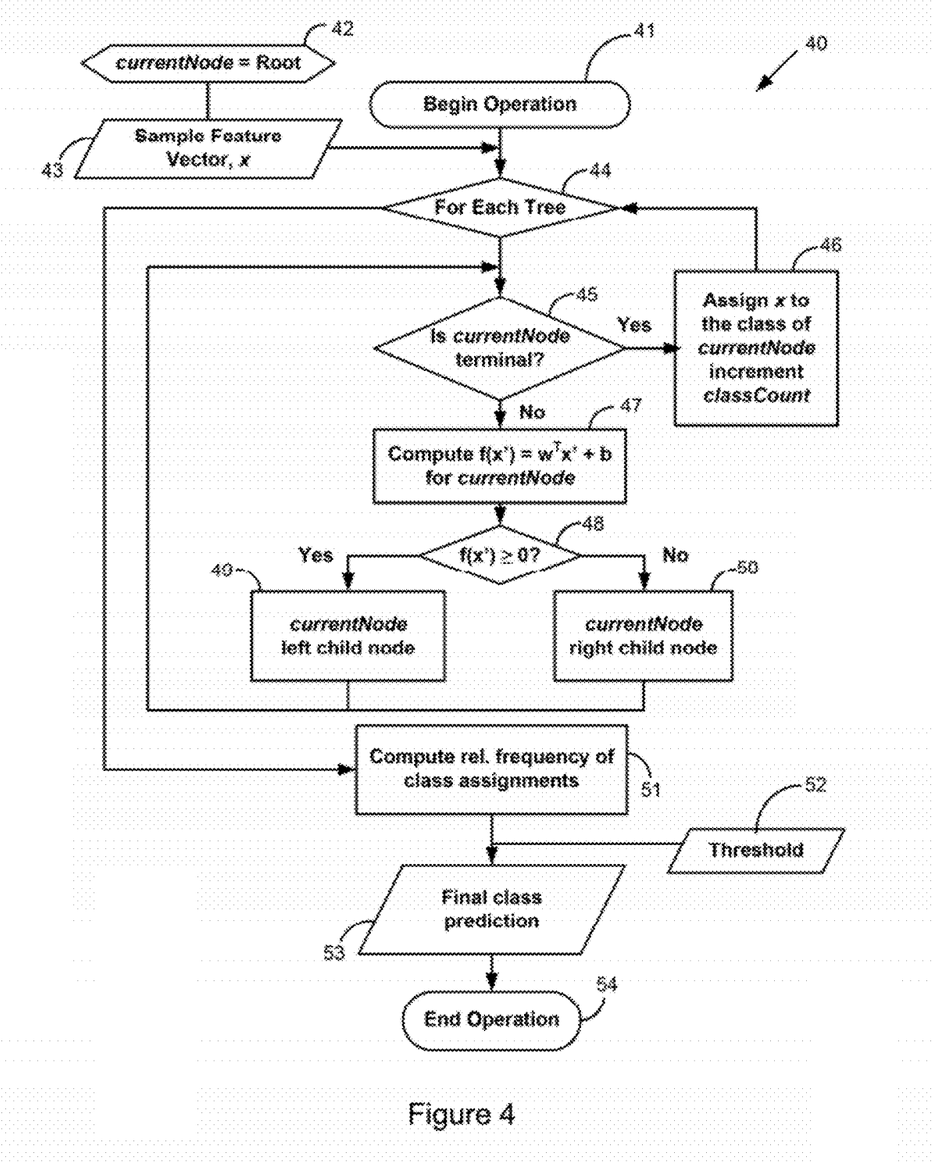
FIG. 4 shows a flowchart of an exemplary method for predicting the classification of a sample of unknown class using the LDA-based Discriminant Forest produced according to FIGS. 1-3.

FIG. 4 shows a flowchart of an exemplary method for predicting the classification of a sample of unknown class using the fully constructed LDA-based discriminant forest produced according to FIGS. 1-3, and generally indicated at reference character 40. Generally, class predictions are performed by propagating a new test sample through each tree and assigning a class label, or vote, based upon the leaf node that receives the sample. Typically, the sample is assigned to the class receiving the majority vote. This is because the resulting relative frequencies of votes effectively estimate the true class-specific probabilities, which may then be thresholded to make a classification decision.

In particular, the prediction operation begins at block 41 where sample feature vector, x, of unknown feature class is received as input from block 43. Additionally, at block 42, the root node of a first LDA-based decision tree is assigned as the current node, i.e. the variable "currentNode." Next at block 44, each decision tree is considered, and at block 45, for a particular decision tree, a determination is made with the currentNode is terminal. If yes, then at block 46, x is assigned to the class of currentNode, a counter called "classCount" for a particular class is incremented, and control is returned to block 44 to consider the next LDA-based decision tree. If at block 45 the currentNode is not terminal, then $f(x') = w^T x' + b$ is computed for the currentNode at block 47, and a determination is made at block 48 whether f(x') is greater than or equal to 0. If f(x') is greater than or equal to 0, then the left child node is selected at as the new current decision node, i.e. currentNode, at block 49. If f(x') is less than 0, the right child node is selected as the new current decision node, at block 50. In either case, control returns to block 45 to determine if the current decision tree is terminal. In this manner, additional votes for the various classes are accumulated. It is notable that the classCount values for the various feature classes is tracked at block 51 which computes the relative frequency of class assignments. A threshold 52 is used to make a final class prediction 53 based on the computed relative frequency of class assignments, i.e. the feature class having the most votes among all decision trees in the forest. The operation ends at block 54, at which point, the final class prediction may preferably be provided to a user. In this regard, it is notable that the prediction may be provided, for example, in graphical or text based format displayed on a computer monitor or provided in print form. The user may also be provided with, for example, performance assessment/statistics in the form of ROC (Receiver Operating Characteristic) curve data, which describes the expected tradeoffs between false alarms and missed detections for general use of the classifier.

AB-Based Node Splitting and Tree Training

Figure 5:
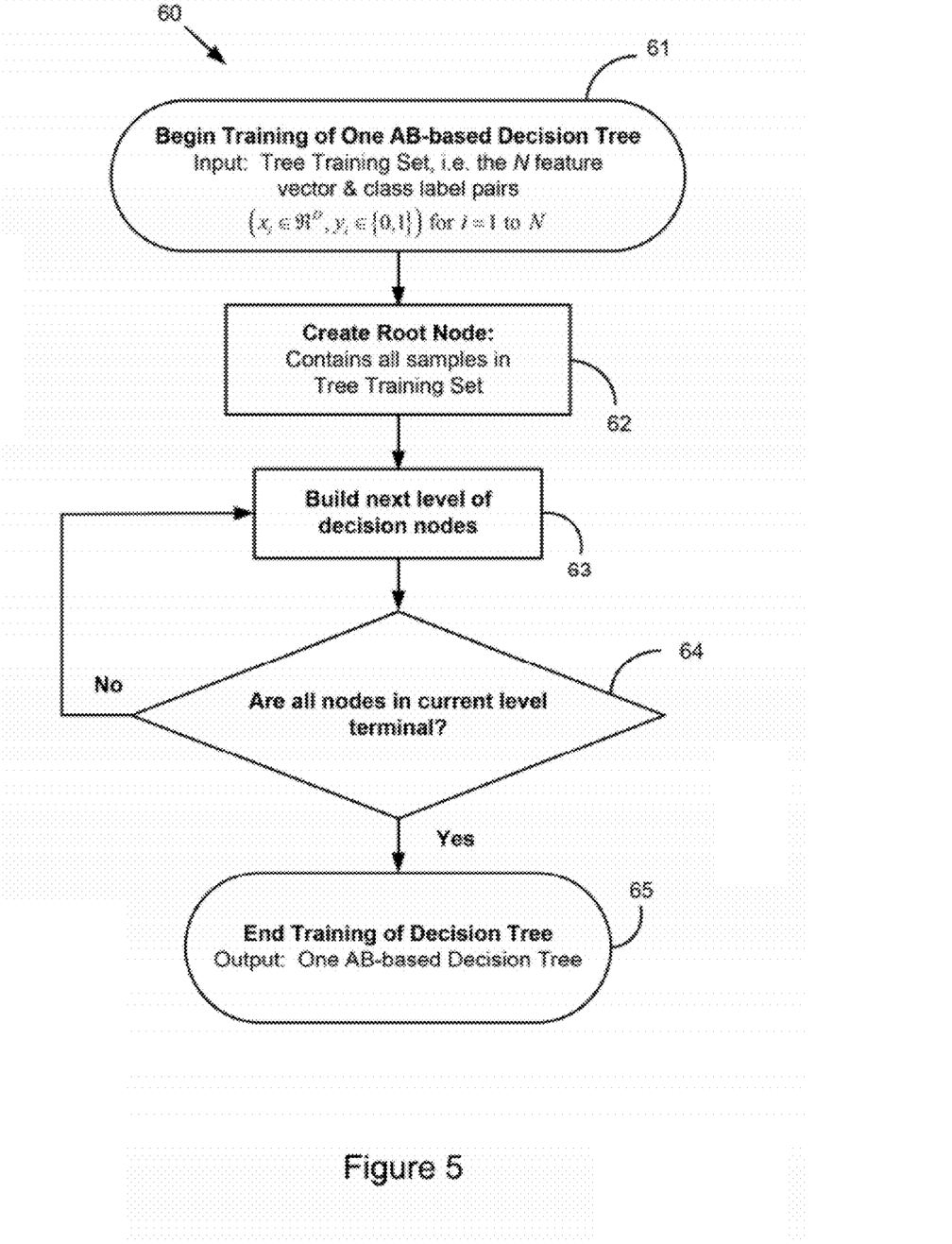
FIG. 5 shows a flowchart of a second exemplary AB-based tree training method used in the Discriminant Forest methodology of the present invention.

Similar to FIGS. 2 and 3 discussed above, FIGS. 5 and 6 illustrate a second exemplary case of AB-based node splitting employed in the tree training routine (block 14 of FIG. 1) of the DF classification method of the present invention. In particular, FIG. 5 shows a flowchart of a second exemplary AB-based decision tree training method, generally indicated at reference character 60. At block 61, the AB-based decision tree training begins for the newly added decision tree with the tree training set created in block 13 of FIG. 1. A root node is then created at block 62 containing all samples in the tree training set. At block 63, new levels of decision nodes are then built by node splitting using a discriminate analysis technique, such as AB described in detail in FIG. 6. For purposes of node splitting, the root node is considered the first "current level," with subsequent current levels being progressively assigned to "next levels" of newly formed "child nodes." As indicated by the return arrow from block 64 to block 63, additional levels of the decision tree are built by node splitting, until a determination is made at block 64 that all nodes in the current level are terminal, i.e. leaf nodes. It is appreciated that a decision node is terminal (i.e. a leaf node) if it is homogenous i.e. containing only samples of a single class, or some other predefined stopping criterion is satisfied, such as for example, containing fewer samples than a specified threshold, or exceeding a maximum count of decision nodes or tree levels (i.e. tree depth). If all nodes in the current level are terminal, then training of the added decision tree ends at block 65, and one AB-based decision tree is produced.

Figure 6:
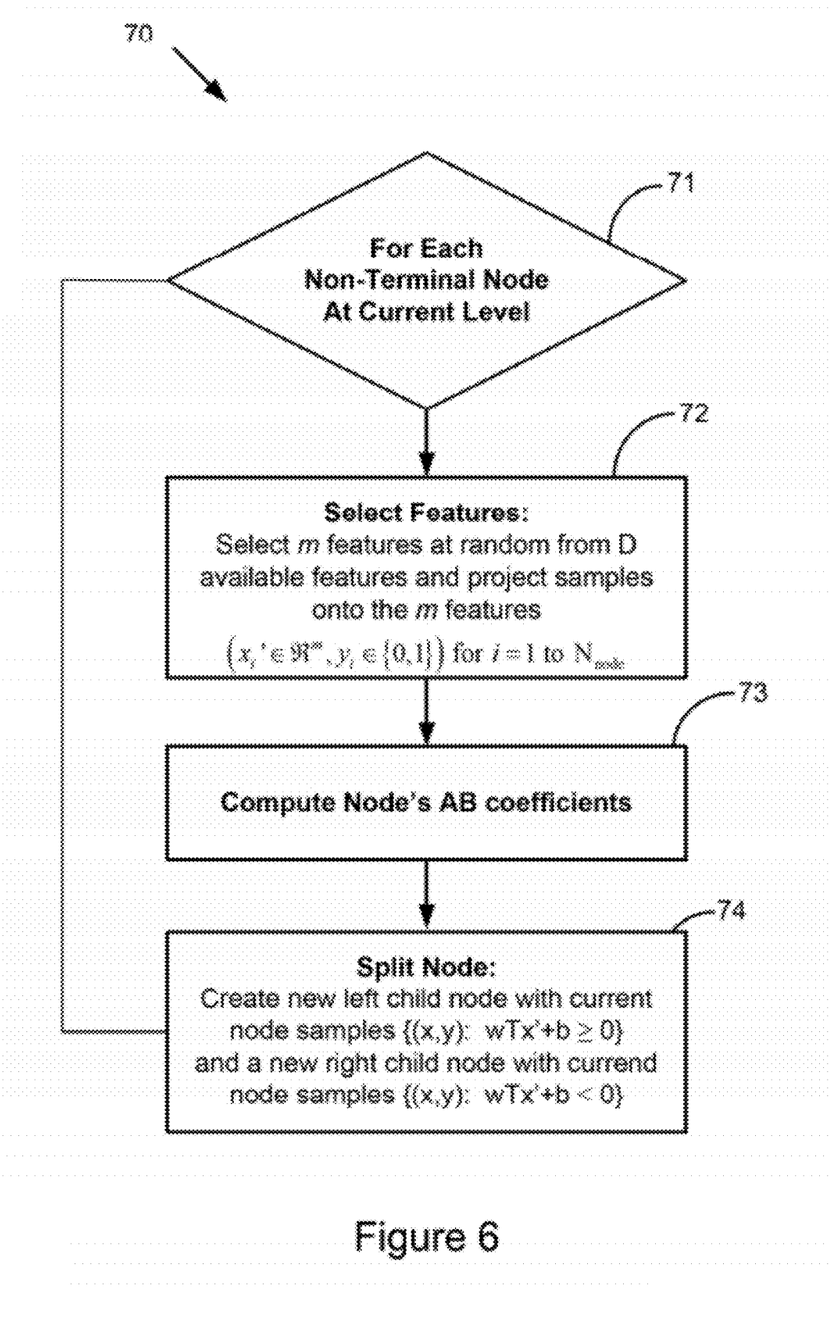
FIG. 6 shows a flowchart of an exemplary method for building a next level of decision nodes in an AB-based decision tree.

FIG. 6 shows a flowchart of an exemplary method for building new levels of decision nodes in an AB-based decision tree, and generally indicated at reference character 70. As such, 70 of FIG. 6 illustrates one exemplary method of performing block 63 in FIG. 5. Beginning at block 71, a determination is made whether a non-terminal node or nodes exist at the current level. If a non-terminal node or nodes exist, blocks 72-74 are performed for each of the non-terminal nodes. If no non-terminal nodes exist at the current level, all decision nodes are determined to be terminal at block 64 of FIG. 5, and the training for the particular decision tree ends. If non-terminal nodes are found, control transfer to block 72 where, for each non-terminal node at the current level, m features are selected at random from the D available features, and the samples are projected onto the m features. In this case, $(x_i' \in \Re^m, y_i \in \{0,1\})$ for i=1 to $N_{node}$.

Next at Block 73, AB coefficients, w and b, are computed by the computerized system over all $N_{node}$ samples, $x_i$, contained in the non-terminal decision node projected onto the m features, $x_i'$, to form a linear decision boundary defined by the LDA coefficients. In particular, w, is computed from:

$$w = S^{-1}(\mu_1 - \mu_0) \qquad (27)$$

and the intercept, b, is computed from:

$$b = -\frac{w^T \mu_0 (w^T S_1 w)^{1/2} + w^T \mu_1 (w^T S_0 w)^{1/2}}{(w^T S_0 w)^{1/2} + (w^T S_1 w)^{1/2}} \qquad (28)$$

where:

$$S_W = \lambda S_0 + (1-\lambda) S_1 \qquad (29)$$

$$S_k = \frac{1}{N_k - 1} \sum_{i=1}^{N_k} (x_i - \mu_k)(x_i - \mu_k)^T \qquad (30)$$

$$\lambda = \underset{\lambda}{\operatorname{argmax}} \left\{ \frac{w^T (\mu_1 - \mu_0)}{(w^T S_0 w)^{1/2} + (w^T S_1 w)^{1/2}} \right\} \qquad (31)$$

$$\mu_k = \frac{1}{N_k} \sum_{i=1}^{N_k} x_i \qquad (32)$$

It is appreciated, however, as discussed in the Summary, that for a large condition number, κ, greater than a predetermined threshold value, the linear decision boundary is preferably a perpendicular bisector fitted between the class means, where $$w = \mu_1' - \mu_0' \qquad (33)$$

$$b = -\frac{1}{2}(\mu_1' - \mu_0')^T (\mu_0' + \mu_1') \qquad (34)$$

The condition number $$\kappa = \frac{\sqrt{|\lambda_{max}|}}{\sqrt{|\lambda_{min}|}},$$

and $\sqrt{|\lambda_i|}$, i=1, ..., n are the singular values of AA, which is the product of matrix $A_{n \times n}$ and its conjugate transpose. A large condition number indicates that a matrix is numerically ill-conditioned and either cannot be inverted, or inversion will lead to numerical instability. When this condition occurs at a node, rather than fit a decision boundary via LDA, a perpendicular bisector is fitted between the class means.

And at block 74, the samples of the non-terminal decision node ("parent node") are then split into two new decision nodes of a next level ("child nodes") by populating one of the child nodes with the samples of the parent node for which $f(x') = w^T x' + b \geq 0$ and the other child node with the samples of the parent node for which $f(x') = w^T x' + b < 0$.

For each terminal decision node of the current level of the added decision tree, the class of the terminal decision node is recorded as positive if its samples lie on the positive side of the linear decision boundary used to split its parent node. Otherwise the class of the terminal decision node is recorded as negative.

After node-splitting is performed for all non-terminal nodes of a current level at block 74, and all terminal nodes are recorded, the "current level" is reset to the level of the child nodes, if any, and control returns to block 71 to determine if any non-terminal nodes exist in the new current level. In this manner, the added decision tree is grown as a AB-based decision tree. Additional decision trees that are added to the discriminant forest at block 12 of FIG. 1, may be similarly grown according to the AB-based node splitting and tree training described in FIGS. 5 and 6, until a discriminant forest of n AB-based decision trees is produced.

Figure 7:
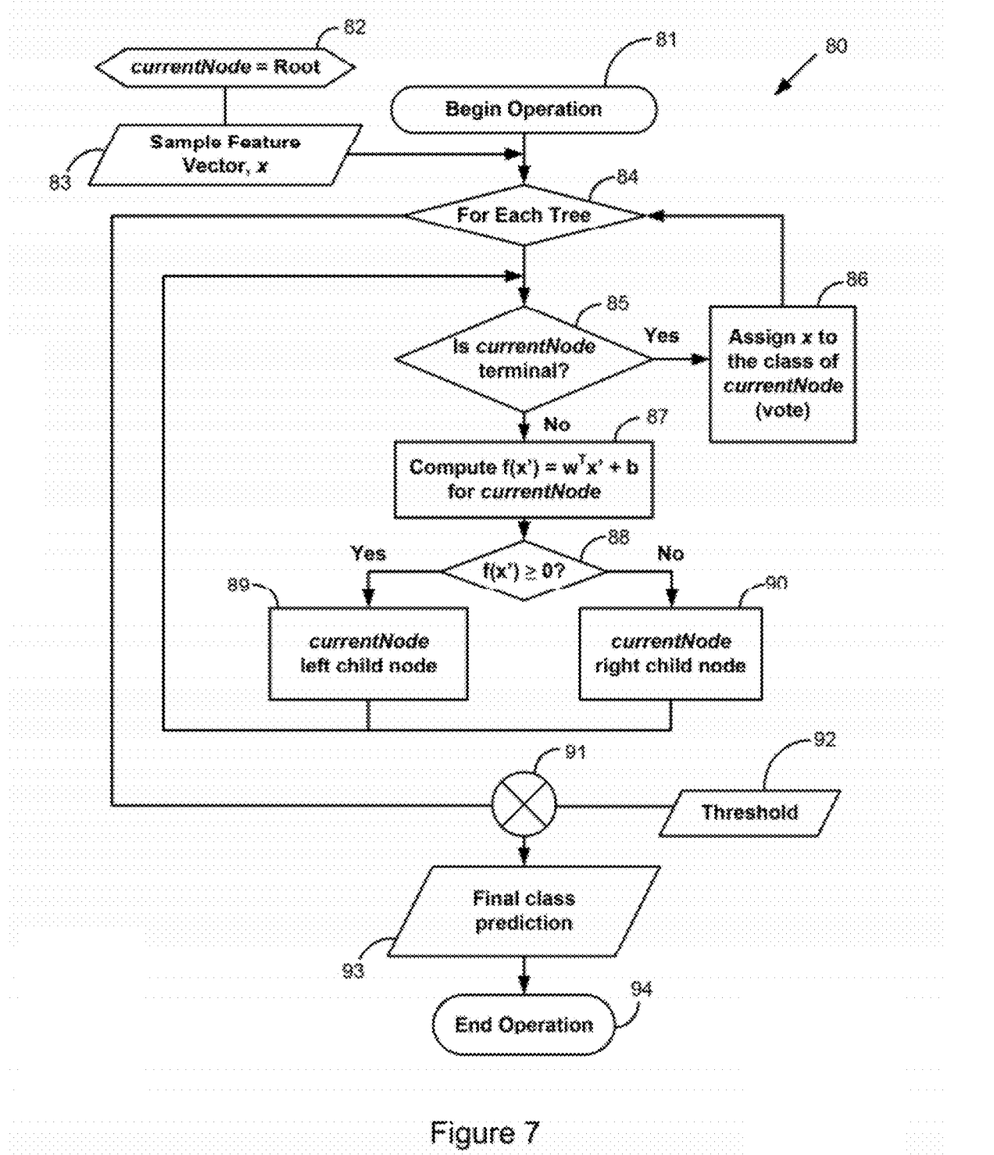
FIG. 7 shows a flowchart of an exemplary method for predicting the classification of a sample of unknown class using the AB-based Discriminant Forest produced according to FIGS. 1, 5, and 6.

FIG. 7 shows a flowchart of an exemplary method for predicting the classification of a sample of unknown class using the fully constructed AB-based discriminant forest produced according to FIGS. 1, 5, and 6, and generally indicated at reference character 80. Generally, class predictions are performed by propagating a new test sample through each tree and assigning a class label, or vote, based upon the leaf node that receives the sample. Typically, the sample is assigned to the class receiving the majority vote. This is because the resulting relative frequencies of votes effectively estimate the true class-specific probabilities, which may then be thresholded to make a classification decision.

In particular, the prediction operation begins at block 81 where sample feature vector, y, of unknown feature class is received as input from block 83. Additionally, at block 82, the root node of a first AB-based decision tree is assigned as the current node, i.e. the variable "currentNode." Next at block 84, each decision tree is considered, and at block 85, for a particular decision tree, a determination is made with the currentNode is terminal. If yes, then at block 86, x is assigned to the class of currentNode, and a vote is given, and control is returned to block 84 to consider the next AB-based decision tree. If at block 85 the currentNode is not terminal, then $f(x')=w^T x'+b$ is computed for the currentNode at block 87, and a determination is made at block 88 whether $f(x')$ is greater than or equal to 0. If $f(x')$ is greater than or equal to 0, then the left child node is selected at as the new current decision node, i.e. currentNode, at block 89. If $f(x')$ is less than 0, the right child node is selected as the new current decision node, at block 90. In either case, control returns to block 85 to determine if the current decision tree is terminal. In this manner, additional votes for the various classes are accumulated. It is notable that votes for the various feature classes is thresholded at block 91 by a threshold value provided by block 92. This is used to make a final class prediction at 93. The operation ends at block 54, at which point, the final class prediction may preferably be provided to a user. In this regard, it is notable that the prediction may be provided, for example, in graphical or text based format displayed on a computer monitor or provided in print form. The user may also be provided with, for example, performance assessment/statistics in the form of ROC (Receiver Operating Characteristic) curve data, which describes the expected tradeoffs between false alarms and missed detections for general use of the classifier.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A hybrid random forest (RF) and discriminant analysis (DA) method of training a computerized system to predict the class membership of a sample of unknown class, comprising:
    providing a forest training set to the computerized system comprising N feature vector ($\hat{x}_i$) and class label ($\hat{y}_i$) pairs, where $\hat{x}_i \in \Re^D$ and $\hat{y}_i \in \{0, 1\}$ for i=1 to N, and from D available features; and
    controlling the computerized system to repeat the following set of steps until a desired forest size having n decision trees has been reached:
        adding a decision tree to the forest,
        creating a tree training set associated with the added decision tree, said tree training set comprising N bootstrapped training samples randomly selected with replacement from the forest training set, and
        using the tree training set to train the added decision tree by using hierarchical Linear Discriminant Analysis (LDA)-based decisions to perform splitting of decision nodes and thereby grow the added decision tree as an LDA-based decision tree,
    whereby, upon reaching the desired forest size, the computerized system may predict the classification of a sample of unknown class using the n DA-based decision trees,
    wherein the step of training the added decision tree using hierarchical LDA-based decisions comprises:
    creating a root node containing all samples in the tree training set associated with the added decision tree; and
    starting with the root node level as a current level, controlling the computerized system to repeat the following set of steps until all decision nodes at the current level are terminal:
    (a) for each non-terminal decision node of the current level of the added decision tree:
        1. selecting m features at random from D available features and projecting samples contained by the node onto the m features, where $x'_i \in \Re^m$, $y_i \in \{0, 1\}$ for i=1 to $N_{node}$
        2. computing LDA coefficients, w and b, over all $N_{node}$ samples, $x_i$, contained in the non-terminal decision node projected onto the m features, $x'_i$, to form a linear decision boundary, $f(x')=w^T x'+b$ defined by the LDA coefficients,
        3. splitting the samples of the non-terminal decision node ("parent node") into two new decision nodes of a next level ("child nodes") by populating one of the child nodes with the samples of the parent node for which $f(x')=w^T x'+b \geq 0$ and the other child node with the samples of the parent node for which $f(x')=w^T x'+b<0$,
    (b) for each terminal decision node of the current level of the added decision tree, recording the class of the terminal decision node as positive if its samples lie on the positive side of the linear decision boundary used to split its parent node, and as negative otherwise, and
    (c) setting the current level to the level of the child nodes, if any, whereby the added decision tree is grown as a LDA-based decision tree.

2. The method of claim 1, wherein $$w = S^{-1}(\mu'_1 - \mu'_0)$$

$$b = -0.5^*(\mu'_1 + \mu'_0)^T S^{-1}(\mu'_1 - \mu'_0) + \log\left(\frac{\pi_1}{\pi_0}\right)$$

$$S_W = S_0 + S_1$$

$$S_k = \sum_{i=1}^{N_k} (x'_{ki} - \mu'_k)(x'_{ki} - \mu'_k)^T$$

$$\mu'_k = \frac{1}{N_{node}} \sum_{i=1}^{N_k} x'_i$$

where is a common covariance matrix, $S_W$ is a pooled covariance estimate, $S_k$ is a covariance estimate for the kth class, $\mu_k'$ is a mean vector for the kth class, and $\pi_k$ is the prior probability of the $k^{th}$ class.

3. The method of claim 1, wherein for a large condition number, κ, greater than a predetermined threshold value, the linear decision boundary is a perpendicular bisector fitted between the class means, where $$\kappa = \frac{\sqrt{|\lambda_{max}|}}{\sqrt{|\lambda_{min}|}},$$

and $\sqrt{|\lambda_i|}$, i=1, . . . , n are the singular eigenvalues of AA, which is the product of matrix $A_{n \times n}$ and its conjugate transpose.

4. The method of claim 1, further comprising controlling the computerized system to report statistics associated with the n LDA-based decision trees to a user.

5. The method of claim 1, further comprising controlling the computerized system to provide the n LDA-based decision trees as machine-readable code capable of being executable by a second computerized system for predicting the classification of a sample of unknown class on the second computerized system.

6. A hybrid random forest (RF) and discriminant analysis (DA) method of training a computerized system to predict the class membership of a sample of unknown class, comprising:
providing a forest training set to the computerized system comprising N feature vector ($\hat{x}_i$) and class label ($\hat{y}_i$) pairs, where $\hat{x}_i \in \Re^D$ and $\hat{y}_i \in \{0,1\}$ for i=1 to N, and from D available features; and
controlling the computerized system to repeat the following set of steps until a desired forest size having n decision trees has been reached:
adding a decision tree to the forest,
creating a tree training set associated with the added decision tree, said tree training set comprising N bootstrapped training samples randomly selected with replacement from the forest training set, and
using the tree training set to train the added decision tree by using hierarchical Anderson-Bahadur Linear Discriminant (AB)-based decisions to perform splitting of decision nodes and thereby grow the added decision tree as an AB-based decision tree,
whereby upon reaching the desired forest size, the computerized system may predict the classification of a sample of unknown class using the n DA-based decision trees.

7. The method of claim 6, wherein the step of training the added decision tree using hierarchical AB-based decisions comprises:
creating a root node containing all samples in the tree training set associated with the added decision tree; and
starting with the root node level as a current level, controlling the computerized system to repeat the following set of steps until all decision nodes at the current level are terminal:
(a) for each non-terminal decision node of the current level of the added decision tree:
1. selecting m features at random from D available features and projecting samples contained by the node onto the m features, where ($x_i' \in \Re^m, y_i \in \{0,1\}$) for i=1 to $N_{node}$ 2. computing AB coefficients, w and b, over all $N_{node}$ samples, $x_i$, contained in the non-terminal decision node projected onto the m features, $x_i'$, to form a linear decision boundary, $f(x')=w^T x'+b$ defined by the AB coefficients,
3. splitting the samples of the non-terminal decision node ("parent node") into two new decision nodes of a next level ("child nodes") by populating one of the child nodes with the samples of the parent node for which $f(x')=w^T x'+b \geq 0$ and the other child node with the samples of the parent node for which $f(x')=w^T x'+b<0$,
(b) for each terminal decision node of the current level of the added decision tree, recording the class of the terminal decision node as positive if its samples lie on the positive side of the linear decision boundary used to split its parent node, and as negative otherwise, and
(c) setting the current level to the level of the child nodes, if any, whereby the added decision tree is grown as a LDA-based decision tree.

8. The method of claim 7, wherein $$w = S^{-1}(\mu_1' - \mu_0')$$

$$b = -\frac{w^T \mu_0'(w^T S_1 w)^{1/2} + w^T \mu_1'(w^T S_0 w)^{1/2}}{(w^T S_0 w)^{1/2} + (w^T S_1 w)^{1/2}}$$

$$S_W = \lambda S_0 + (1-\lambda) S_1$$

$$S_k = \frac{1}{N_{mode}-1} \sum_{i=1}^{N_k} (x_i' - \mu_k')(x_i' - \mu_k')^T$$

$$\lambda = \underset{\lambda}{\mathrm{argmax}} \left\{ \frac{w^T(\mu_1' - \mu_0')}{(w^T S_0 w)^{1/2} + (w^T S_1 w)^{1/2}} \right\}$$

$$\mu_k' = \frac{1}{N_{node}} \sum_{i=1}^{N_k} x_i'$$

where $S^{-1}$ is a common covariance matrix, $S_W$ is a pooled covariance estimate, $S_k$ is a covariance estimate for the kth class, $\mu_k'$ is a mean vector for the kth class, and λ is a weighting factor.

9. The method of claim 7, wherein for a large condition number, κ, greater than a predetermined threshold value, the linear decision boundary is a perpendicular bisector fitted between the class means, where $$w = \mu_1' - \mu_0'$$

$$b = -\frac{1}{2}(\mu_1' - \mu_0')^T(\mu_0' + \mu_1')$$

$$\kappa = \frac{\sqrt{|\lambda_{max}|}}{\sqrt{|\lambda_{min}|}},$$

and $\sqrt{|\lambda_i|}$, i=1, . . . , n are the singular eigenvalues of AA, which is the product of matrix and its conjugate transpose.

10. The method of claim 6, further comprising controlling the computerized system to report statistics associated with the n AB-based decision trees to a user.

11. The method of claim 6,
further comprising controlling the computerized system to provide the n AB-based decision trees as machine-readable code capable of being executable by a second computerized system for predicting the classification of a sample of unknown class on the second computerized system.

12. A hybrid random forest (RF) and discriminant analysis (DA) method of predicting the classification of a sample of unknown class, comprising:
providing a forest-trained computerized system trained according to claim 1 with n DA-based decision trees;
causing the forest-trained computerized system to:
receive as input one or more samples of unknown class, characterized as sample feature vector(s) x;
for each of the n DA-based decision trees and beginning with the root node of each decision tree,
(a) determining if the current decision node is terminal;
(b) if the current decision node is terminal, assigning x to the class of the current decision node and returning to step (a) for the next decision tree;
(c) if the current decision node is not terminal, computing a linear transformation $f(x')=w^T x'+b$ for the current decision node, determining if $f(x')$ is greater than or equal to 0, selecting the left child node as the new current decision node if $f(x') \geq 0$, selecting the right child node as the new current decision node if $f(x')<0$, and returning to step (a) for the current decision tree;
computing the relative frequency of class assignments for x in the n DA-based decision trees;
based on a predetermined threshold value, determining a final class prediction based on the relative frequency of class assignments in the n DA-based decision trees; and
providing the final class prediction to a user.

13. A hybrid random forest (RF) and discriminant analysis (DA) method-based computerized system for predicting the classification of a sample of unknown class, comprising:
computer input means for receiving one or more samples of unknown class, characterized as sample feature vector(s) x;
computer processor means trained according to claim 1 with n DA-based decision trees, wherein for each of the n DA-based decision trees and beginning with the root node of each decision tree the computer processor means is adapted to:
(a) determine if the current decision node is terminal;
(b) if the current decision node is terminal, assigning x to the class of the current decision node and returning to step (a) for the next decision tree;
(c) if the current decision node is not terminal, computing a linear transformation $f(x')=w^T x'+b$ for the current decision node, determining if $f(x')$ is greater than or equal to 0, selecting the left child node as the new current decision node if $f(x') \geq 0$, selecting the right child node as the new current decision node if $f(x')<0$, and returning to step (a) for the current decision tree;
computer processor means for computing the relative frequency of class assignments for x in the n DA-based decision trees;
computer processor means for, based on a predetermined threshold value, determining a final class prediction based on the relative frequency of class assignments in the n DA-based decision trees; and
computer output means for providing the final class prediction to a user.

\* \* \* \* \*